No. 697,260. Patented Apr. 8, 1902.
K. R. LEEHART.
TRACTION ENGINE DRIVING WHEEL.
(Application filed Jan. 21, 1902.)
(No Model.)
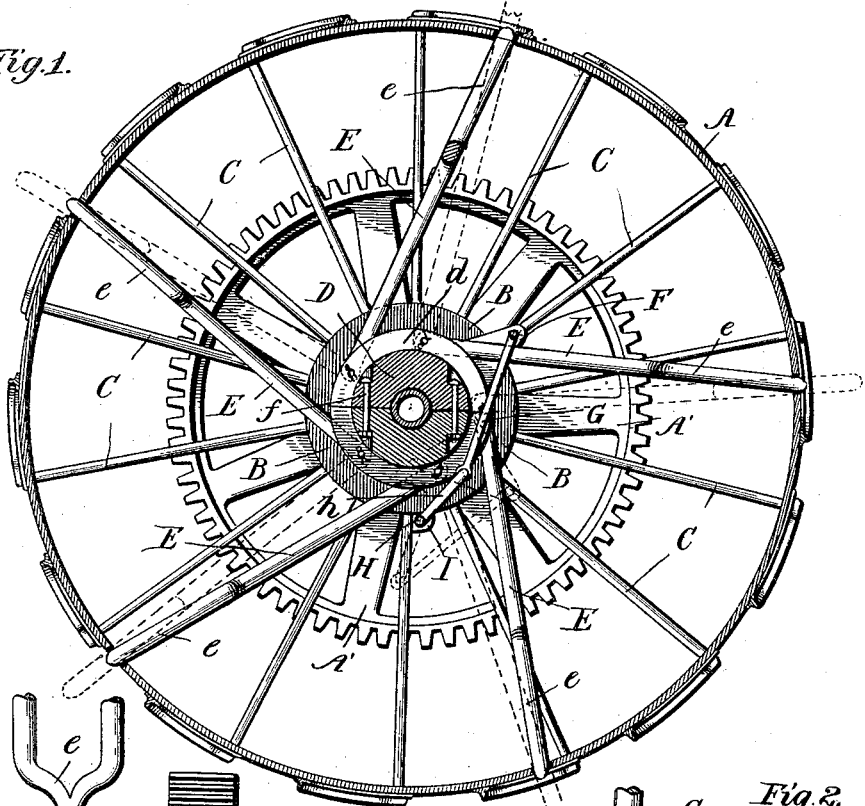
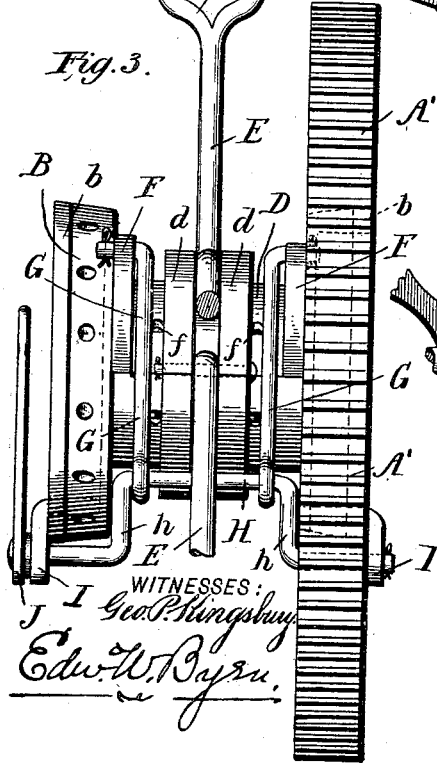
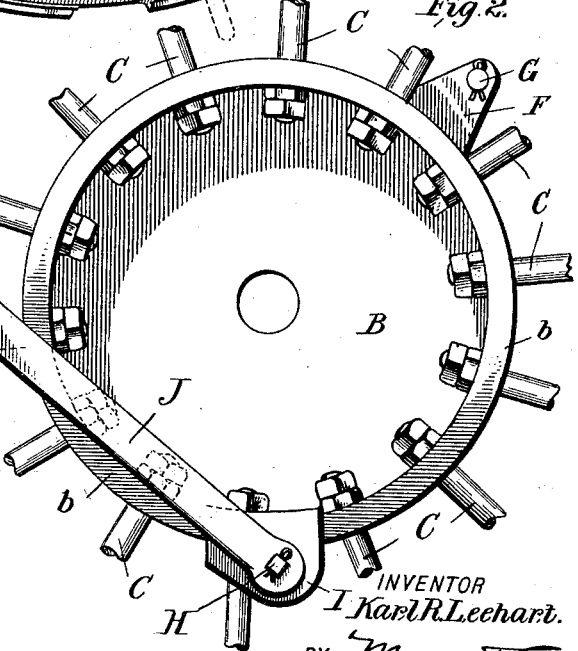
INVENTOR
Karl R. Leehart.
BY Munn & Co.
ATTORNEYS

UNITED STATES PATENT OFFICE.

KARL RANSOM LEEHART, OF LUCAS, IOWA.

TRACTION-ENGINE DRIVING-WHEEL.

SPECIFICATION forming part of Letters Patent No. 697,260, dated April 8, 1902.

Application filed January 21, 1902. Serial No. 90,664. (No model.)

*To all whom it may concern:*

Be it known that I, KARL RANSOM LEEHART, of Lucas, in the county of Lucas and State of Iowa, have invented a new and useful Improvement in Traction-Engine Driving-Wheels, of which the following is a specification.

The object of my invention is to provide the driving-wheel of a traction-engine with means for increasing its bite or engagement with the ground in passing over muddy or icy roads.

My invention is an improvement upon that arrangement of calks which may be instantly projected or withdrawn from the rim of the wheel, so as to meet the requirement of increased tractive effect on muddy and icy roads, or be as quickly withdrawn before passing over a bridge, so as to do no damage to its flooring, thus saving much time and expense in the service of this costly machine and its engineer; and it consists in the peculiar construction and arrangement of parts, which I will now proceed to describe with reference to the drawings, in which—

Figure 1 is a section through the entire wheel, taken at right angles to the axle; and Fig. 2 is an end view, and Fig. 3 a side view, of the hub on a larger scale.

In the drawings, A represents the ordinary driving-wheel of a traction-engine, which has rigidly attached to one side the gear-wheel A', through which power is applied to turn it. This gear-wheel has a hub B, formed at each end with an enlarged flange $b$ and $b'$, which flanges are respectively connected to the rim of the wheel by the two series of metal spokes C, as usual. Between these flanges and on the smaller central part of the hub I arrange a rotary adjustable sleeve D, having in the middle two circular flanges $d$ $d$. Between these flanges are jointed on pins a series of extensible calk-bars E, whose outer ends are forked at $e$ and pass through corresponding holes in the rim of the wheel. At the inner ends these calk-bars connect with the sleeve in tangential relation, while at the outer ends they are approximately radial to the rim. Normally the outer ends all lie within the circle of the rim; but by turning the sleeve D on the hub they are all projected through the rim, as seen in dotted lines in Fig. 1, a distance far enough to allow them to dig into the earth and secure a firm anchorage hold on the ground to prevent the wheel from slipping on muddy or icy roads. To turn this sleeve, there is rigidly attached to it at each end a crank-arm F F, and these are jointed at their outer ends to links G G, which at their other ends are jointed to a crank $h$ on a crank-shaft H, which lies parallel to the axle and is journaled in two clips I I, bolted to the flanges at the ends of the hub. A rigidly-attached lever J is fixed to this crank-shaft, and when this lever is turned in one direction it rotates the sleeve D to project the calk-bars beyond the rim of the wheel, and when turned in the other direction it turns the sleeve in the other direction to withdraw the calk-bars into the circle of the rim. It will thus be seen that each drive-wheel is provided with means for instantly bringing into or out of action the calks, as may be desired, with no loss of time or inconvenience to the engineer.

The sleeve D is made in two parts, joining together on a diametrical line and bolted together by bolts $f$, so that they may be easily applied to the hub between its two end flanges.

The object in making the outer ends of the calk-bars forked and extending the branches through separate holes in the rim is to keep the said bars from turning about their longitudinal axes and also to give a better bite or engagement with the ground. They also prevent that weakening of the tire which a large hole for a broad calk-bar would involve and are not so apt to become clogged with ice or mud, nor do they scrape the dirt or snow from under the drive-wheel without propelling it, as a single broad calk will do.

It will be seen that the calk-bars are made in one piece from the inner end to the fork, and when the said calk-bars are projected they occupy a radial position, as shown in dotted lines, in which the inward thrust of the calk-bars from pressure on the ground has little or no tendency to turn the sleeve and requires no special locking device for each calk-bar. The shaft-bearings I are also placed on the exterior of the hub-flanges, and the journal-bearings in the same are outside of the hub-flanges, so as to establish the axis for the rock-shaft outside of the hub without cutting or boring the same, while the cranked portion $h\ h$ of the rock-shaft is projected in between the hub-flanges, where it is housed and out of the way and in proper position to exercise the necessary draft on the links.

Having thus described my invention, what I claim as new, and desire to secure by Letters Patent, is—

1. A drive-wheel for a traction-engine having on its hub a rotary adjustable sleeve with two flanges $d\ d$ near the middle thereof, calk-bars made in a single piece hinged at their inner ends between the two flanges of the sleeve and having their outer ends divided into two branches, and a rim or tire having holes through which the forked branches protrude.

2. A drive-wheel for a traction-engine comprising a hub with flanges on its ends, a rotary adjustable sleeve on the hub between said flanges, calk-bars jointed to the sleeve and extending through the rim of the wheel, a crank-arm rigidly fixed to the said sleeve, a link attached thereto, a rock-shaft with cranked portion attached to said link, and separate clips bolted to the flanges of the hub and having journal-bearings for the rock-shaft, and means for adjusting said rock-shaft substantially as described.

3. A drive-wheel for a traction-engine, comprising a hub with end flanges, a rotary adjustable sleeve arranged on said hub between its end flanges and carrying at each end a rigidly-attached crank-arm, calk-bars jointed to the sleeve and extending through the rim of the wheel, links connected to the crank-arms of the sleeve, a rock-shaft journaled in bearings on the hub parallel to the same and having a middle cranked portion extended inwardly between the hub-flanges and connected to the two links, and means for adjusting the rock-shaft substantially as described.

4. A drive-wheel for a traction-engine, comprising a hub with end flanges of greater diameter than the middle part, a rotary adjustable sleeve arranged on the hub between the end flanges and having at each end a rigidly-attached crank-arm F and in the middle the two flanges $d\ d$, calk-bars made in a single piece hinged between the flanges $d\ d$ at their inner ends and made forked at their outer ends and extending through holes in the rim, links G G connected to the cranks of the sleeve, a rock-shaft having a cranked portion $h$ extended inwardly between the hub-flanges and connected to the two links, and detachable bearing-clips fastened to the external faces of the hub-flanges and carrying the rock-shaft substantially as described.

KARL RANSOM LEEHART.

Witnesses:
WILLIAM EDGAR LEEHART,
WILLIAM NEWTON PRIMM.